No. 888,738. PATENTED MAY 26, 1908.
F. E. PROCTOR.
NUTCRACKER.
APPLICATION FILED AUG. 22, 1906.
Fig. 1.
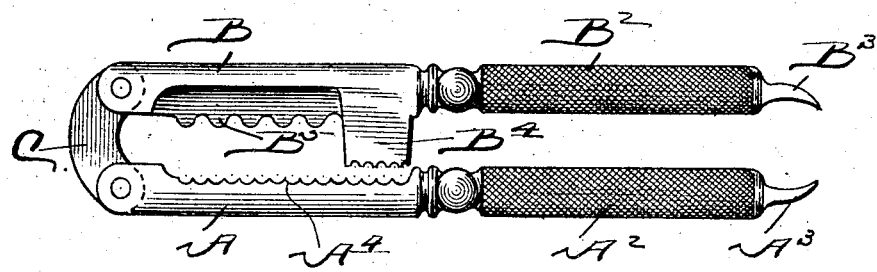
Fig. 2.
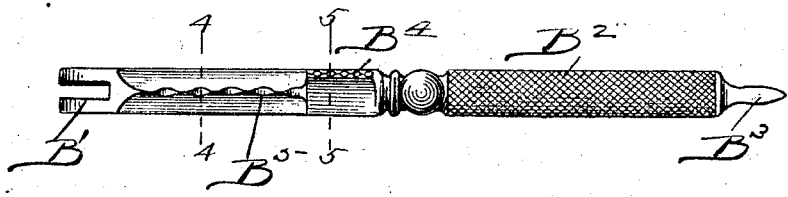
Fig. 3.
Fig. 4.   Fig. 5.
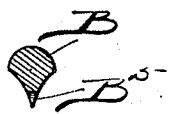 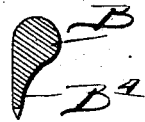
WITNESSES
W. D. Blondel
Rea P. Wright
INVENTOR
F. E. Proctor.
By O'Meara & Brock
ATTYS.

UNITED STATES PATENT OFFICE.

FRANK E. PROCTOR, OF GRAND RAPIDS, MICHIGAN.

NUTCRACKER.

No. 888,738.      Specification of Letters Patent.      Patented May 26, 1908.

Application filed August 22, 1906. Serial No. 331,633.

*To all whom it may concern:*

Be it known that I, FRANK E. PROCTOR, a citizen of the United States, residing at Grand Rapids, in the county of Kent and State of Michigan, have invented a new and useful Improvement in a Nutcracker, of which the following is a specification.

This invention relates to nut crackers and more particularly to combined nut crackers and picks, the object being to provide a cracker so constructed that the nut will be cut so that the meat can be readily taken out in two pieces.

Another object of my invention is to provide the cracker with a knife adapted to cut the end of the nut off, before they are cut longitudinally in half.

With these objects in view, the invention consists in the novel features of construction, hereinafter fully described and pointed out in the claims.

In the drawings forming a part of this specification:—Figure 1 is a side view of my improved cracker. Fig. 2 is a top plan view of the lever conveying the cutters. Fig. 3 is a top plan view of the lever forming the base. Fig. 4 is a section taken on the line 4—4 of Fig. 2. Fig. 5 is a section taken on lines 5—5 of Fig. 2.

Referring to the drawing, A and B indicate a pair of levers provided with bifurcated ends A', B', in which the apertured ends of a flat curved metal link C, is pivoted connecting the levers together.

The levers are provided with handle portions $A^2$, $B^2$, having reduced sharpened curved ends $A^3$, $B^3$, forming picks which can be readily used for removing the meat from the nuts. A series of ridges $A^4$, are formed on the lever A, adjacent the bifurcated ends forming a base upon which the nut is adapted to rest to be cut. The lever B, is provided with a serrated knife $B^4$, adjacent the handle-portion which extends out to one side of the base when the levers are brought together adapted to cut the ends of the nuts off. A serrated knife $B^5$, extends from the knife $B^4$, to adjacent the bifurcated end adapted to cut the nut longitudinally into when the nut is placed on the base and the levers are brought together.

From the foregoing description it will be readily seen that by cutting the nut longitudinally instead of cracking it, the meat can be readily taken out in two whole pieces without any waste at all.

Having thus fully described my invention, what I claim as new and desire to secure by Letters Patent is:—

1. In a device of the kind described, the combination with a pair of levers pivotally connected together, of a knife extending out to one side of the longitudinal side of one of said levers a series of ridges formed on the other lever and a knife edge formed on the lever provided with the knife, for the purpose described.

2. A nut cracker comprising a pair of levers having bifurcated ends, a link pivoted in said ends connecting said levers, one of said levers having a series of ridges thereon, the other lever having a serrated cutting edge thereon, and a knife formed on the lever provided with the cutting edge, for the purpose described.

3. A nut cracker comprising a pair of levers pivotally connected together; one of said levers being provided with a series of ridges, the other lever being provided with a cutting edge and a serrated cutter secured to the levers with the cutting edge projecting above the first named cutting edge for the purpose described.

FRANK E. PROCTOR.

Witnesses:
    FRANK G. ROW,
    V. C. ROWE.